H. E. TRACY.
GAS RECLAIMER.
APPLICATION FILED MAY 2, 1921.

1,427,337.   Patented Aug. 29, 1922.

Inventor
H. E. Tracy

UNITED STATES PATENT OFFICE.

HALDER E. TRACY, OF MIDDLETOWN, OHIO.

GAS RECLAIMER.

1,427,337.  Specification of Letters Patent.  Patented Aug. 29, 1922.

Application filed May 2, 1921. Serial No. 466,349.

*To all whom it may concern:*

Be it known that I, HALDER E. TRACY, a citizen of the United States, residing at Middletown, in the county of Butler and State of Ohio, have invented certain new and useful Improvements in Gas Reclaimers; and I do hereby declare the following to be a full, clear, and exact description of the invention, such as will enable others skilled in the art to which it appertains to make and use the same.

The object of the invention is to provide means for use in connection with a gasoline or other explosive engines in which the lubrication of the piston is effected by the operation of the crank in the crank case, whereby the oil is retarded in its flow towards the explosion chamber to reduce the carbonization in the cylinder (necessitating under the ordinary practice the relatively frequent burning out of the same) and whereby the finely divided or sprayed oil in the crank case due to the action of the crank is withdrawn from the crank case and separated from the air and gases which are deleterious to the bearings and mechanism of the engine and is returned to the crank case in a liquid form as a means of conserving the oil and preventing the unnecessary wastage thereof, without in any degree detracting from the efficiency of the motor; and with these objects in view, the invention consists in a construction and combination of parts of which a preferred embodiment is shown in the drawings, wherein—

Figure 1:
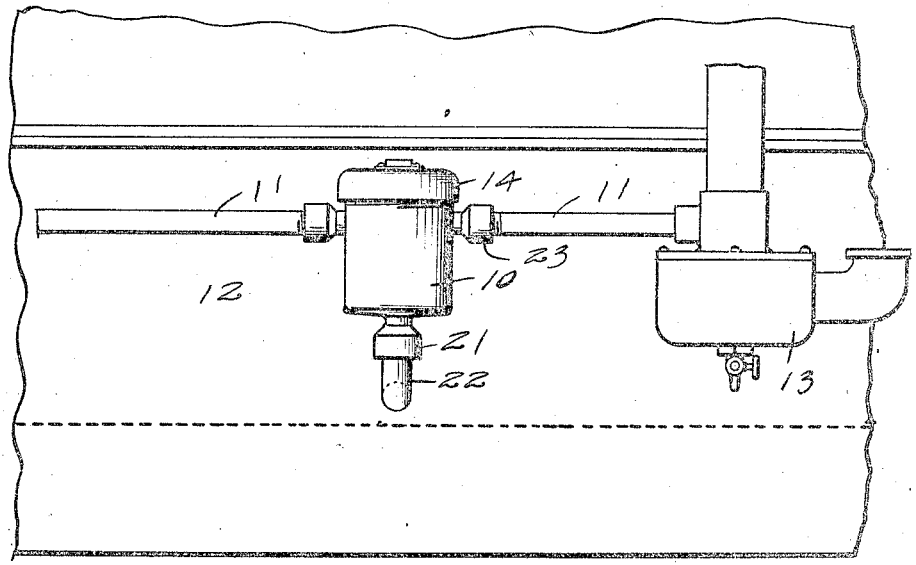
Figure 1 is a side view of the oil reclaiming apparatus applied in the operative position to an engine crank case and arranged in the suction line leading to the carbureter.

The apparatus consists of a closed receptacle or reservoir 10 which is arranged in and intercepts the suction line of the engine represented by the tube or pipe 11 leading from the crank case 12 to the carbureter 13 and exposed in the operation of the engine to a sub-atmospheric pressure causing a partial vacuum in the reservoir which in the construction illustrated is shown fitted with a removable cap 14 in which is arranged an inspection opening 15 fitted with a glass or other transparent panel 16.

The inlet end of the suction line is preferably connected with an inlet opening or the usual breather pipe of the crank case, and the inlet opening 18 of the reservoir is located in the side wall thereof substantially opposite as indicated to the outlet opening 19 thereof, which is in communication with the suction line leading to the carbureter. In the bottom of the reservoir is a drain port 20 which is in communication with a nipple 21 connected by a drain or return pipe or tube 22 with the crank case and designed to serve as a means of conveying the liquid or condensed oil which collects in the reservoir to the crank case for further use in lubrication of the motor.

Figure 2:
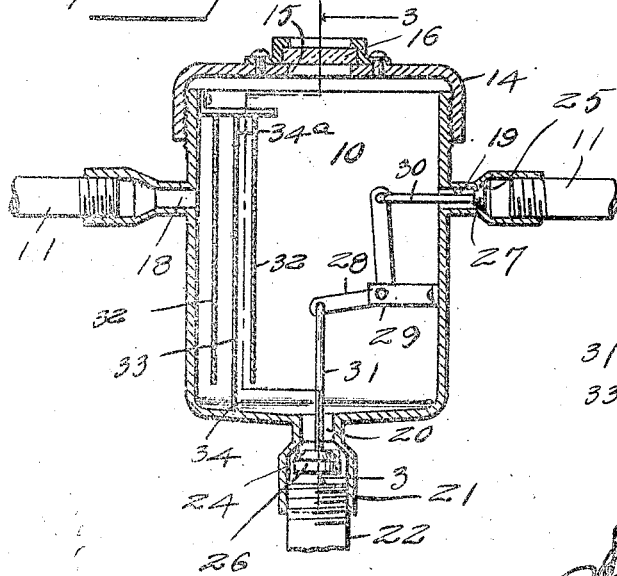
Figure 2 is a detail enlarged sectional view of the reclaiming apparatus.
Figure 3:
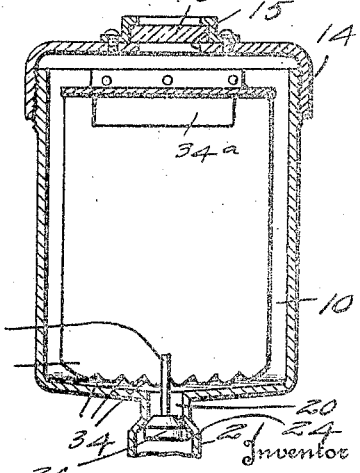
Figure 3 is a detail section at right angles to Figure 2 on the plane indicated by the line 3—3 thereof.

In the nipple 21 and a corresponding nipple 23 which communicates with the outlet port 19 are formed valve seats 24 and 25 for the reception of valves 26 and 27 which are connected together for simultaneous operation by means serving to yieldingly hold the suction valve 27 seated, and the outlet valve 26 unseated as indicated in Figure 2. The suction valve 27 opens in the direction of suction in the line 11 so that on the suction or feeding strokes of the engine, the said valve will be unseated to cause a reduction of pressure in the reservoir and hence in the crank case, which serves to retard the flow of lubricating oil in the cylinder toward the explosion chamber, particularly if there is any looseness in the fit of the piston in the cylinder tending to permit the rapid advance of the lubricating oil towards the explosion chamber.

In the construction illustrated, the connection between said feed or suction valve 27 and the relief or outlet valve 26 consists of a bell crank lever 28 fulcrumed as at 29 and having its arms connected respectively by rods 30 and 31 with the said valves 27 and 26, the outlet or relief valve 26 preferably being of such dimensions as to overbalance the suction valve 27, so that when not subjected to suction, the weight of the outlet valve 26 serves to draw it away from its seat and cause the seating of the suction valve.

In the operation of the device, as will be understood, the suction valve or the valve which is controlled by the reduction of pressure in the suction line due to the strokes of the piston, is unseated to afford communication between the suction line or carbureter and the reservoir at each suction stroke of the piston, until for example, the operation of the engine reaches a speed of approximately eighty revolutions per minute, after which the rapidity of the strokes is sufficient to maintain the suction valve permanently unseated and the outlet or relief valve seated, so that the effect of the reduction of pressure in the suction line and through the carbureter is applied directly to the reservoir and through the latter to the crank case of the engine.

Interposed in the reservoir between the inlet and outlet ports 18 and 19 thereof are imperforate baffles 32 and 33 which serve to intercept the liquid oil entering the reservoir in the form of spray and collect the same so that it will drop to the bottom of the reservoir and thence flow through the outlet or relief port 20 to the crank case of the engine. In the illustrated device an intermediate baffle or curtain 33 is interposed between spaced baffles or curtains 33, the latter terminating short of the bottom of the reservoir, while the former extends to the bottom and is provided in its lower edge with V-shaped notches 34 in its lower edge and a slot 34ª in its upper edge to permit the oil to freely flow thereunder to the outlet 20.

In practice the device serves to withdraw from the crank case all of the sprayed oil which is caused by the dash of the crank, and in addition to retarding the flow of the oil toward the explosion chambers of the cylinders, said spray being separated from the air and gas drawn therewith from the crank case is reduced by the baffles to a liquid form and thence permitted to flow back to the crank case for further use, and in this way a substantial economy in the use of lubricating oil is effected, and at the same time, the gases which ordinarily are produced in the crank case and which serve to corrode the bearings and other parts of the mechanism are removed before injury can result from their presence.

Having thus described the invention what I claim is:—

1. An oil reclaimer for explosion engines having a reservoir provided with inlet and outlet ports for communication respectively with a crank casing and a suction line exposed to sub-atmospheric pressure, a drain port for communication with the crank case to permit reclaimed oil to return to said crank case, and valves controlling said outlet port and drain port movable relatively to their seats by sub-atmospheric pressure in said suction line.

2. An oil reclaimer for explosion engines having a reservoir provided with inlet and outlet ports for communication respectively with a crank case and a suction line exposed to sub-atmospheric pressure, a drain port for communication with the crank case to permit reclaimed oil to return to said crank case, a baffle arranged in the reservoir between said inlet and outlet ports for intercepting oil spray, and connected valves for respectively controlling said outlet port and drain port and respectively movable from and toward their seats by sub-atmospheric pressure in the suction line.

3. An oil reclaimer for explosion engines having a reservoir provided with inlet and outlet ports for communication respectively with a crank case and a suction line exposed to sub-atmospheric pressure, a drain port for communication with the crank case to permit of reclaimed oil to return to said crank case, a baffle arranged in the reservoir between said inlet and outlet ports for intercepting oil spray, and connected valves for respectively controlling said outlet port and drain port and respectively movable from and toward their seats by sub-atmospheric pressure in the suction line, said valves being yieldingly impelled in opposition to the sub-atmospheric pressure in the suction line.

4. An oil reclaiming apparatus for explosion engines having a reservoir provided with inlet and outlet ports respectively in communication with a crank case and a suction line leading to a carbureter and exposed to sub-atmospheric pressure by the suction strokes of the engine pistons, said reservoir also having in its bottom an outlet or drain port for communication with the crank case, baffles interposed between said inlet and outlet ports for intercepting oil spray, valves respectively for said outlet port and drain port and respectively seatable by movement toward the reservoir, and connections between said valves whereby the valve of the outlet port is yieldingly held seated.

5. An oil reclaiming apparatus for explosion engines having a reservoir provided with inlet and outlet ports respectively in communication with a crank case and a suction line leading to a carbureter and exposed to sub-atmospheric pressure by the suction strokes of the engine pistons, said reservoir also having in its bottom an outlet or drain port for communication with the crank case, baffles interposed between said inlet and outlet ports for intercepting oil spray, valves respectively for said outlet port and drain port and respectively seatable by movement toward the reservoir, and connections between said valves whereby the valve of the outlet port is yieldingly held seated, by the weight of the drain valve.

6. An oil reclaiming apparatus for explosion engines having a reservoir provided with inlet and outlet ports for communication respectively with a crank case and a suction line leading to a carbureter and exposed to sub-atmospheric pressure by the suction strokes of the engine pistons, said reservoir having a drain valve in its bottom for communication with the crank case, a baffle located in the reservoir between said inlet and outlet ports for intercepting oil spray, outwardly opening or unseating valves respectively for said outlet port and drain port, a bell crank lever and connections between the arms thereof and said valves whereby the outlet valve is yieldingly held seated.

In testimony whereof I affix my signature in presence of two witnesses.

HALDER E. TRACY.

Witnesses:
A. D. SHERMAN,
H. C. JOHNSON.